July 5, 1932.   R. G. CARLSON   1,866,292
UNION BONNET VALVE
Filed May 21, 1930    2 Sheets-Sheet 1
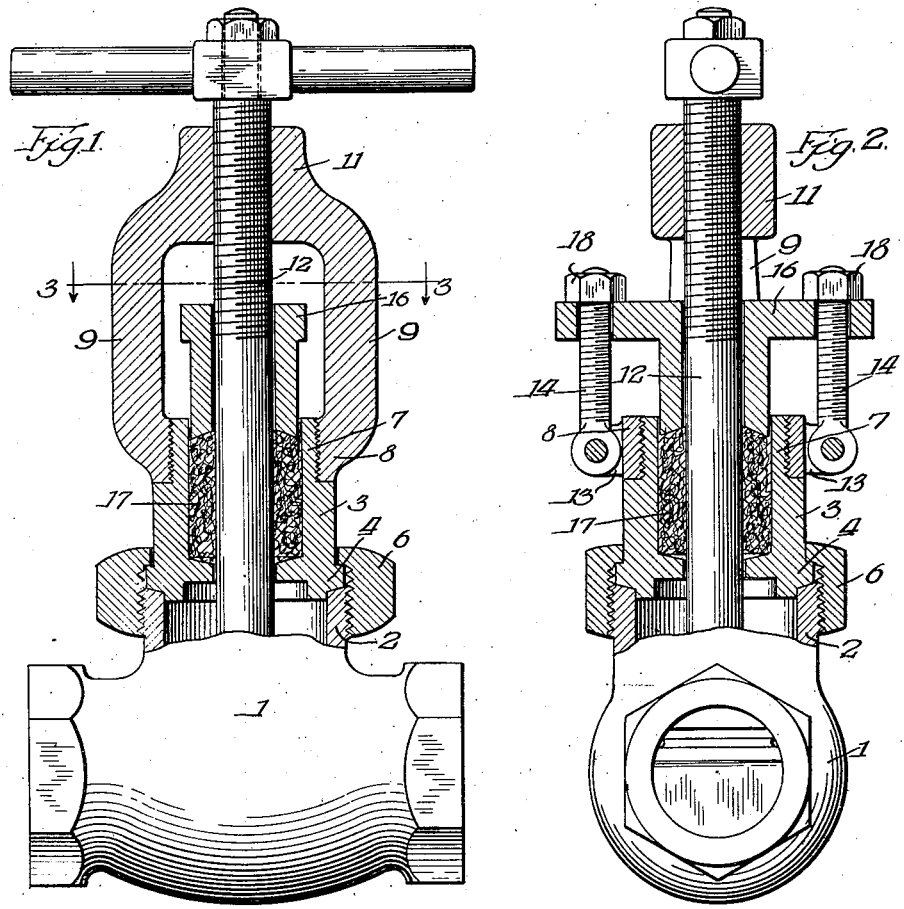
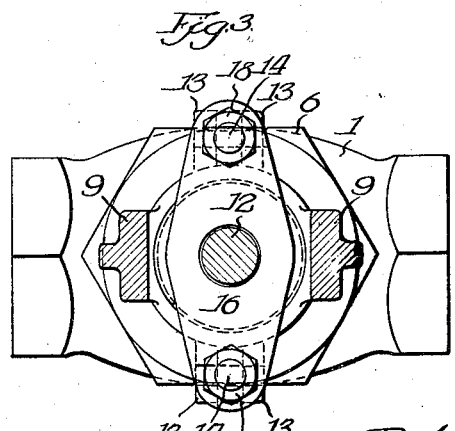
Inventor:
Ralph G. Carlson.

July 5, 1932.   R. G. CARLSON   1,866,292
UNION BONNET VALVE
Filed May 21, 1930   2 Sheets-Sheet 2
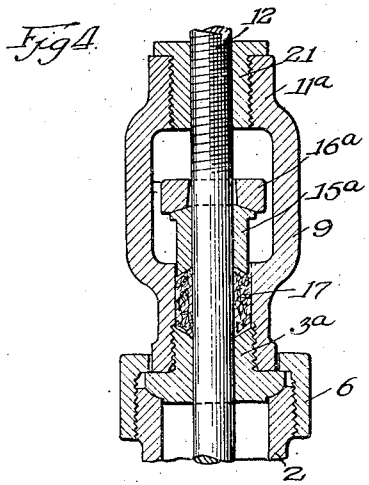
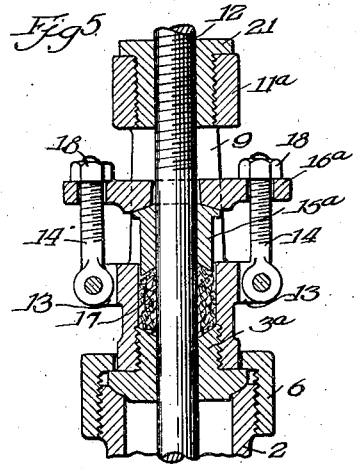
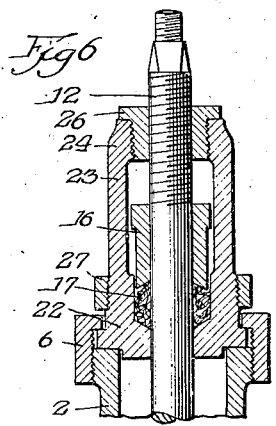
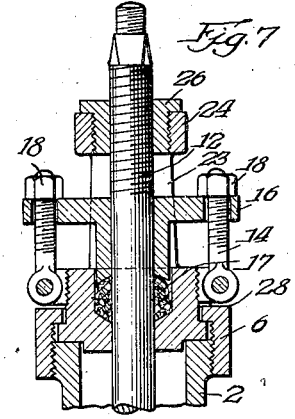
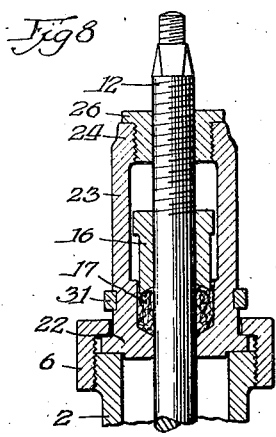
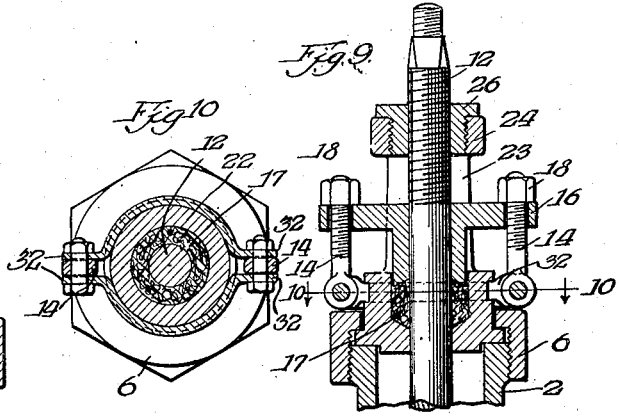
Inventor:
Ralph G. Carlson.
By Wilson, Dowell, McCanna & Rehm
Attys
Witness:
R. B. Davison.

Patented July 5, 1932

1,866,292

UNITED STATES PATENT OFFICE

RALPH G. CARLSON, OF CHICAGO, ILLINOIS, ASSIGNOR TO CRANE CO., OF CHICAGO, ILLINOIS, A CORPORATION OF ILLINOIS

UNION BONNET VALVE

Application filed May 21, 1930. Serial No. 454,204.

This invention relates to valves and more particularly to valves of relatively large sizes and has for its purpose to provide a valve construction whereby a relatively large valve may be manufactured which employs a yoke and yet has all the advantages of a union bonnet construction.

Valves of the relatively large sizes as now manufactured involve the use of a yoke arising from the bonnet and terminating in an upper guide or support for the valve stem. A valve employing a yoke of this kind as heretofore constructed would necessitate such a large union connection as to make the construction prohibitive since the yoke member would necessarily have to pass through the union nut. If the size of the yoke and union nut is reduced as is done in many cases, insufficient means for applying the necessary load on the stuffing box packing results because of the size restrictions necessary in order to pass the entire assembly through the relatively small opening in the union bonnet ring. For example, threaded connections for the stuffing nut, which acts upon a gland and compresses the packing, are employed. This means is not effective, particularly considering the high volatility of fluids, the higher viscosities and extreme pressures and temperatures.

It is a principal object of this invention therefore to provide a construction whereby the yoke of the valve may be secured to the body or bonnet by a union connection of commercially practical size or in a manner which embodies the advantages of a union connection. Such a construction permits the use of the valve under severe service, requiring large and strong yoke members, of a character capable of withstanding severe thrust stresses created by the stem, as well as that of the pressure itself within the pipe line.

It is an object therefore of this invention to provide a valve which permits the use of a large yoke without the use of a large union ring and which will permit the use of a suitable packing nut such as a flange type packing nut or gland.

It is also an object of this invention to provide such a valve construction which is comparatively simple and economical to manufacture, particularly upon a large scale.

In accordance with one application of the principles of this invention the yoke and bonnet are made of two sections which may be rigidly secured together and which in turn may be secured to the body of the valve by a flanged connection or a union connection of relatively small dimensions.

A better understanding will be had of this invention from a consideration of the following description given in connection with the drawings in which:

Fig. 1 is a vertical longitudinal section through the center of a valve constructed in accordance with this invention;

Fig. 2 is a vertical section taken at right angles to that of Fig. 1;

Fig. 3 is a section on line 3—3 of Fig. 1;

Figs. 4 and 5 are vertical sections taken along planes perpendicular to each other of a portion of valve of modified construction embodying the principles of this invention;

Figs. 6 and 7 are vertical sections along planes perpendicular to each other of a still further modified form of valve;

Figs. 8 and 9 are partial vertical sections taken along planes perpendicular to each other of a still further modified form of valve;

Fig. 10 is a section taken on line 10—10 of Fig. 9.

Referring to the drawings and more particularly to Figs. 1, 2 and 3, there is illustrated a valve of the globe type embodying the principles of this invention comprising a body 1 having a threaded bonnet connection portion 2. The bonnet member comprises a sleeve-like member 3, one end of which is flanged as at 4 to provide a ground joint member to be secured to the upper edge of portion 2 of the body by a union nut or ring 6. The upper end 7 of bonnet 3 is threaded externally to receive the lower end 8 of the yoke which is circular in form and threaded internally to engage the end 7. The yoke is provided with a pair of curved arms 9 which extend upwardly and terminate in bearing portion 11 which is threaded internally to engage the threaded portion of the valve stem 12.

The lower ring 8 of the yoke is also provided with two pairs of spaced ears 13 diametrically opposite to each other between which are pivoted two eye bolts 14. The eye bolts pass through the ends of a flanged gland 16 which may be forced into a stuffing box 17 formed in the bonnet by means of nuts 18.

It is obvious that the eye bolt construction shown in this figure, and also as illustrated in Figs. 5, 7 and 9, may be varied to any other suitable form without affecting the principle of this invention. Also, a non-turning stem may be used, as for example, various gate valve constructions sometimes call for a non-turning stem, that is, a stem slidably operative, rather than turning on threads.

Referring to Figs. 4 and 5, the construction shown therein is adapted to form a more compact arrangement than that shown in Figs. 1 to 3, for which reason the bonnet 3a is shorter than that shown in Figs. 1 to 3. The upper end 11a of the yoke is bushed as at 21 instead of being bored to receive the valve stem, as shown in Figs. 1 to 3. Further modifications lie in the fact that the gland is made in two sections 15a and 16a instead of being formed of a single member and the stuffing box is formed in the yoke rather than in the bonnet. In other respects the construction is similar to that previously described.

The construction in Figures 4 and 5, embodying the bushing 21, may be varied by the use of yoke sleeves of various forms common in the construction of valves of this character. In this connection, a non-rising stem valve may necessitate the use of a yoke sleeve using a roller bearing for such loads as are radial, as well as of upward thrust.

In Figs. 6 and 7 there is illustrated a still further modification designed to produce a narrower upper construction of the valve, thus permitting the installation thereof into closer quarters. To this end the bonnet and yoke are formed integrally of one piece having a lower circular end 22 arranged to be engaged by nut 6 and clamped upon the body 2. From the portion 22 the yoke extends upwardly in a pair of arms 23 and terminates in a circular upper end 24 threaded internally to receive a bushing 26 which serves as a guide for the upper end of the valve stem. The lower portion of the integral bonnet and yoke is threaded externally to receive a collar 27 which carries two pairs of spaced ears 28 which serve as the fulcrum points for eye bolts 14 which, as in the form shown in Figs. 1 to 3, extend through a flanged gland 16 to force the same into stuffing box 17.

In the form of this invention illustrated in Figs. 8, 9 and 10, the construction is similar to that shown in Figs. 6 and 7 with the exception of the manner of securing the eye bolts 14 to the combined yoke and bonnet. For this purpose the lower end 22 of the bonnet is provided with an annular groove therearound to receive a split collar 31, the connecting ends of which are bent outwardly to form two spaced ears 32 between which the eye bolts 14 are pivoted. In all other respects this modification is similar to that described in Figs. 6 and 7.

When it is desired that valves be made which are even too large to permit of a union ring construction in the bonnet, as previously described, a bolted construction may be used. Making screw threads of extremely large diameter also presents quite a problem, and, therefore, necessitates the use of some other form of connection such as a bolted flanged joint. Heretofore, both the yoke and the bonnet have been cast in one piece, or else the yoke is drop forged separately, as covered in the Houser, et al. Patent No. 1,736,405, issued November 19, 1929. Both of these forms of valves of the character described are relatively expensive to manufacture, not susceptible of quick and economical assembly and in some instances present difficulty in foundry and/or forging operation, due to the size, shape or construction of the article.

Valves constructed in accordance with the foregoing disclosures may be readily repaired and may be swung through the various connecting mediums to be installed in close quarters.

It is apparent from the foregoing that a valve has been provided which gives all the advantages of a union bonnet valve as well as the advantages of a yoke construction valve and provides satisfactory means for packing the valves, yet eliminating the necessity of having excessively large union rings or nuts. It is also to be noted that the connection between the bonnet and the yoke need not necessarily be pressure tight but simply provide for an adequate connection between these parts.

It is obvious that many changes may be made in the details of construction without departing from the spirit and scope of this invention as defined in the claims appended hereto.

I claim:

1. In a valve construction, a body member, a yoke having a pair of spaced arms terminating in a valve stem guide at one end, a removable connecting element secured to the other end of said arms and a union joint connecting said yoke through said connecting element to said body member, the internal diameter of the union nut of said joint being less than the greatest distance across said arms.

2. In a valve construction, a body member, a yoke having a pair of spaced arms terminating in a valve stem guide at one end, a packing gland disposed between said arms, means pivoted to said yoke for adjustably securing said gland in position, and a union joint connecting said yoke to said body member.

3. In a valve construction, a body, a yoke having a pair of spaced arms terminating in a valve stem guide at one end, a bonnet of smaller diameter than the distance across said arms, means for securing said yoke to said bonnet, and a union joint connecting said bonnet to said body the union nut of said latter joint being removable over said bonnet.

4. In a valve construction, a body, a yoke having a pair of spaced arms terminating in a valve stem guide at one end, a bonnet of smaller diameter than the distance across said arms threaded at one end to said yoke and secured at its other end to said body by a union joint the union nut of said latter joint being removable over said bonnet.

5. In a valve construction, a body, a valve stem therein, a yoke having a pair of spaced arms terminating in a valve stem guide at one end, a bonnet of smaller diameter than the distance across said arms secured at one end to said yoke and at its other end to said body by a union joint the union nut of said latter joint being removable over said bonnet, a packing gland disposed between the arms of said yoke, packing surrounding said stem beneath said gland and arranged to be compressed thereby, and means secured to said yoke for adjustably securing said gland in position.

6. In a valve construction, a body member, a yoke having a pair of spaced arms terminating in a valve stem guide at one end, a bonnet of smaller diameter than the distance across said arms secured at one end to said yoke and at its other end to said body by a union joint the union nut of said latter joint being removable over said bonnet, said bonnet being recessed to provide a stuffing box, a packing gland disposed between the arms of said yoke and extending into said stuffing box, and means secured to said yoke for adjustably securing said gland in position.

7. In a valve construction, a body member, a yoke having a pair of spaced arms terminating in a valve stem guide at one end and being bored at its other end to provide a stuffing box, a packing gland disposed between the arms of said yoke, means secured to said yoke for adjustably securing said gland into position, and a bonnet secured at one end to said yoke and at its other end to said body by a union joint.

8. In a valve construction, a body and a yoke member, said yoke member having a pair of spaced arms terminating at their upper ends in a valve stem guide, an annular ring of less diameter than the distance across said arms and constituting one member of a union joint connected to the lower ends of said arms, and a union nut for securing said ring to the body.

9. In a valve construction, a body member, a yoke having a pair of spaced arms terminating in a valve stem guide at one end, a union joint connecting said yoke to said body, a flanged gland disposed between the arms of said yoke, and means for adjustably securing said gland in position comprising a collar secured to the lower end of said yoke, and bolts secured to said collar and extending through said flange.

10. In a valve construction, a body member, a yoke having a pair of spaced arms terminating in a valve stem guide at one end, a union joint connecting said yoke to said body, a gland disposed between the arms of body, a gland disposed between the arms of said yoke, and means for adjustably securing said gland in position comprising a collar threadedly secured to the lower end of said yoke, and bolts secured to said collar.

11. In a valve construction, a body member, a yoke having a pair of spaced arms terminating in a valve stem guide at one end and being provided with an annular groove around its periphery adjacent its other end, a union joint connecting said yoke to said body, a gland disposed between the arms of said yoke, and means for adjustably securing said gland in position comprising a collar seated within said groove and bolts secured to said collar.

In witness of the foregoing I affix my signature.

RALPH G. CARLSON.